United States Patent [19]

Denley

[11] Patent Number: 5,779,343
[45] Date of Patent: Jul. 14, 1998

[54] HEADLIGHT ADJUSTER

[75] Inventor: Ronald S. Denley, Woodstock, Ill.

[73] Assignee: Elco Industries, Rockford, Ill.

[21] Appl. No.: 670,408

[22] Filed: Jun. 25, 1996

[51] Int. Cl.⁶ .................................................. B60Q 1/04
[52] U.S. Cl. ..................... 362/66; 362/69; 362/273; 362/289
[58] Field of Search ........................... 362/66, 69, 273, 362/284, 289, 423, 424, 425, 428; 74/89.17, 89.15

[56] References Cited

U.S. PATENT DOCUMENTS 5,193,905 3/1993 Edwards et al. .................... 362/425
5,351,170 9/1994 Nagengast et al. .................. 362/66

*Primary Examiner*—Y. My Quach
*Attorney, Agent, or Firm*—Leydig, Voit & Mayer, Ltd.

[57] ABSTRACT

A headlight adjuster for adjusting the aim of a headlight. The adjuster provides relatively fine incremental control of headlight motion in response to relatively coarse adjustment of a drive shaft. This functionality is achieved by use of a link having two gear driven sections. A first helical section engages a drive gear which serves as the mechanical input. A second threaded section of relatively fine thread engages a nut fixed in the adjuster housing. The link is carried in a linear bearing which allows free rotation of the link in accordance with the mechanical input. The degree of translation, however, is controlled by the pitch of the thread engaging the nut.

20 Claims, 4 Drawing Sheets

HEADLIGHT ADJUSTER

TECHNICAL FIELD OF THE INVENTION

The present invention relates generally to adjustment devices and, more particularly, to a headlight adjuster which operates in an accurate and precise manner to effect proper aiming of the headlight beam.

BACKGROUND OF THE INVENTION

A successful prior art headlight adjuster is disclosed in U.S. Pat. No. 5,193,905 issued to Edwards et al. Like other adjusters, the Edwards device includes an adjusting link which adjusts the aim of a headlight when the link is moved linearly back-and-forth. One end of the link is connected to the headlight and the other end includes an acme helical gear form. The link is secured against rotation in an elongated slide having a generally rectangular cross-section, received by a similarly shaped passage in a plastic housing. The interaction of the slide and the passage prevents the slide and attached link from rotating with respect to the housing, but allows them to move linearly back-and-forth within the passage. The helical gear form of the link mates with a helical drive gear on a manually rotatable drive shaft. The drive shaft is rotatably mounted in the housing and is oriented generally perpendicular to the link. Thus these elements form an arrangement which can be likened to a rack and pinion. The link, which is secured against rotation in the housing acts as a rack slideable in the passage, and the gear rotated by the drive shaft acts as a pinion to linearly translate the "rack". In operation, when the drive shaft is rotated, the gear of the drive shaft translates the link to slide linearly back-and-forth within the passage of the housing, to thereby effect adjustment of the headlight. The mechanical arrangement of that system dictates that the range of linear travel required must be accomplished in one full turn. This travel requirement dictates the minimum pitch diameter of the driving gear, and thus imposes a constraint on fine adjustment. As a consequence, only relatively rough adjustments can be made with the Edwards device, which makes it difficult to precisely adjust the aim of the headlight.

OBJECTS AND SUMMARY OF THE INVENTION

In view of the foregoing, a general object of the present invention is to provide a new and improved headlight adjuster which although of simple construction provides much finer (an order of magnitude or more) and more precise adjustment.

A more particular object of the invention is to provide a headlight adjuster utilizing a right-angle helical drive, but wherein the rate of translation per turn of the drive gear is much finer than has been achieved in the past.

A feature of the invention in a preferred implementation is an adjustment precision which is over 20 times finer than that achieved by the aforementioned prior art arrangement.

A further object of the present invention is to provide a headlight adjuster of the foregoing type which is constructed of inexpensive cold headed steel and plastic molded parts, wherever practical.

In connection with the foregoing object, it is a further object to provide a ready adjustment for operating torque which accommodates for a range of tolerance variations, so as to provide headlamp adjusters which are readily uniform from unit to unit in the torque needed to operate the adjuster.

It is a feature of the present invention that a headlight adjuster is provided having a relatively inexpensive, but precision helical gear set which is formed by a rolling process used in threading fasteners, to provide an inexpensive right-angle drive, in which a link, formed to serve as one member of the right-angle helical gear drive, also includes a fine pitch machine screen thread for controlling the translation per degree of rotation of the link. Thus, it is a feature of the present invention to provide a headlight adjuster in which the increment of translation per degree of rotation is relatively fine as would be characteristic of a precisely machined gear box, but which an inexpensive precision rolled gear set provides the motive force.

These and other features and advantages of the invention will become apparent upon reading the following description of a preferred exemplified embodiment of the invention, and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the appended claims.

DETAILED DESCRIPTION OF THE PREFERRED EMBODIMENT

Figure 1:
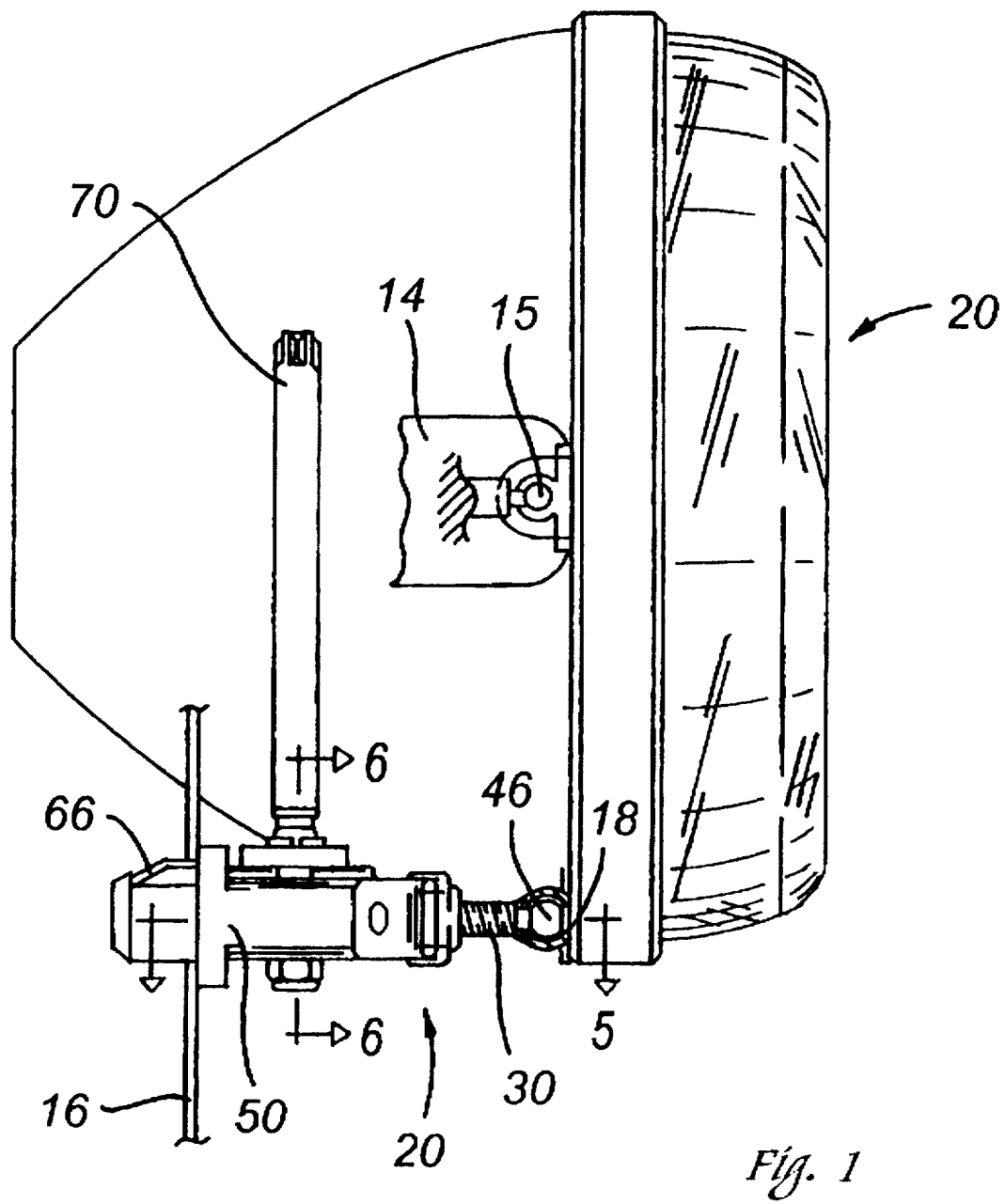
FIG. 1 is a side elevational view of an automotive headlight assembly equipped with a headlight adjuster constructed in accordance with the present invention.

Referring now to the drawings, FIG. 1 shows a headlight adjuster constructed in accordance with the teaching of the present invention and generally designated by reference numeral 20. For the purpose of providing a detailed description of the preferred embodiment, the headlight adjuster 20 will be described as being connected to a headlight assembly 12, and being used as a means for accurately aligning the beam of the headlight assembly 12 with respect to a vehicle (e.g. an automobile) (not shown). Notwithstanding this characterization, it will be readily appreciated by those skilled in the art that the headlight adjuster 20 described and claimed herein may be utilized in other contexts and should not be construed solely as a vehicle headlight adjuster.

The headlight assembly 12 may be mounted in various ways and, for the purpose of simplicity, is shown only diagrammatically in FIG. 1. In particular, the headlight assembly 12 is mounted on a generally horizontally extending fixed frame member 14 which forms a part of the vehicle, and is supported to rotate about a pivot 15. Another fixed frame 16, arranged behind the pivot 15 and disposed generally vertically, supports the headlight adjuster 20. It will be understood, of course, that the headlight adjuster 20 normally retains the headlight assembly 12 in a fixed position with respect to the vehicle. Should the headlight assembly 12 become out of alignment, however, the headlight adjuster 20 may be used to adjust the vertical tilt of the headlight assembly 12 by causing the headlight assembly 12 to rotate about the fixed spherical pivot 15 (which is vertically in line with the adjuster ball end 46) to adjust the headlight aim vertically. A similar adjuster and associated pivotable mounting arrangement is provided for horizontal or side-to-side headlight aim adjustment when the horizontal adjuster pivot is horizontally in line, and radially opposed to the fixed pivot 15.

Connected to the headlight assembly 12 is an elongated and generally cylindrical link 30 which forms a part of the headlight adjuster 20. In use, when the link 30 is moved linearly back-and-forth along the longitudinal axis of the link 30, the headlight assembly 12 rotates slightly about the pivot 15 which causes the vertical tilt of the headlight assembly 12 and, more particularly, the direction of the headlight beam to change. For instance, when the link 30 is advanced (i.e. moved to the right in FIG. 1), the headlight assembly 12 is tilted upwardly, and when the link 30 is retracted (i.e. moved to the left), the headlight assembly 12 is tilted downwardly.

In carrying out the present invention, the forward end of the link 30 is adapted to be connected to the headlight assembly 12 by means which allows axial rotation of the link 30. As shown in FIG. 1, a generally spherical head 46, formed integrally with the forward end of the link 30, is received within a generally spherical seat 18 which forms a part of the headlight assembly 12.

This type of coupling provides a pivotal connection between the headlight assembly 12 and the link 30 and enables the headlight assembly 12 to rotate about the pivot 15 as the link 30 is advanced or retracted. Although the link 30 is readily connected to the headlight assembly 12 in this manner, it will be appreciated by those skilled in the art that other equivalent means for pivotally connecting the link 30 to the headlight assembly 12 could alternatively be used.

The aft end of the link 30 is received by a housing 50 which, in turn, is mounted to the vertical frame 16. While the housing 50 may take various forms, see FIG. 2, the housing 50 of the illustrated embodiment is formed of one-piece plastic construction and includes a generally triangular body portion 52 and a mounting flange 68. Two laterally spaced holes 69, formed through the body portion 52 and the mounting flange 68 of the housing 50, receive screws or other fasteners (not shown) which are used to affix the mounting flange 68 to the vertical frame 16.

Figure 6:
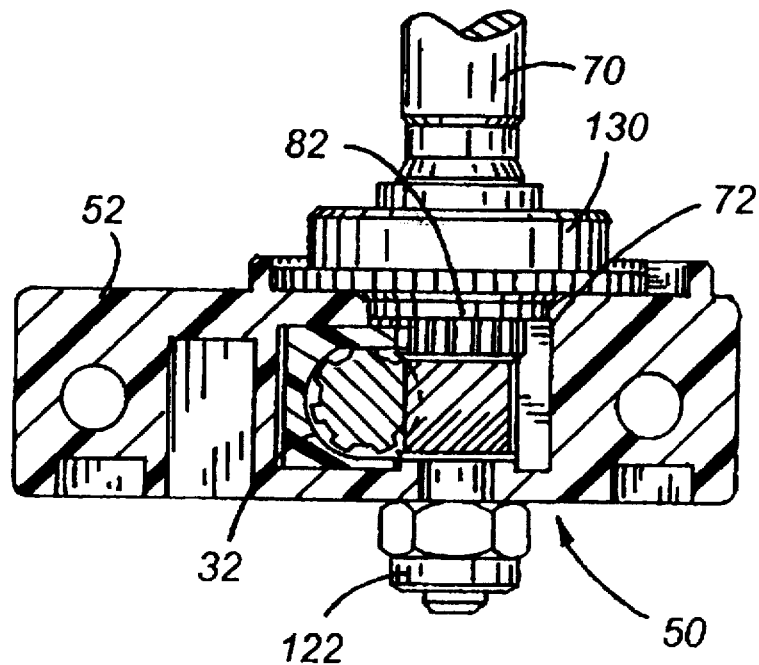
FIG. 6 is an enlarged cross-sectional view of the headlight adjuster taken substantially along line 6—6 in FIG. 1.

In keeping with an important aspect of the present invention, the link 30 is formed with two discrete helixes, with a gap 140 in between each intended to accommodate a somewhat different function. A first threaded section 32, formed toward the aft end of the link 30, is a rolled, precision right-angle helical gear which is the driven portion of a mating pair. A second threaded section 42, also formed on the same link 30 has a relatively fine thread, and is intended to mate with apparatus to control the linear advance per unit rotation of the link. Thus, the gear section 32 cooperates with a drive gear to rotate the link, and the fine thread section 42 converts the rotation into an incremental advance or retract linear motion, which has much finer resolution than the incremental motion achievable in practicing the aforementioned prior arts As best shown in FIG. 6, the first threaded section 32 of the link 30 engages a drive gear 72 formed on a drive shaft 70. The drive shaft 70 is rotatably mounted in the body portion 52 of the housing 50 and is arranged generally perpendicular to the link 30. The drive gear 72 of the drive shaft 70 is formed with a rolled, precision right-angle helical gear 73 which mates with the gear form 33 of section 32 of the link. Because of the meshing of the gear teeth 73 with the gear form 33, rotation of the drive gear 72 will impose a rotational force on the link which causes link 30 to also translate. In the prior art construction described above, because the link is restrained from rotation, rotation of the drive gear simply translates the link.

In accordance with the present invention, the link 30 is constrained in a slide mechanism in such a way as to allow rotation of the link within the slide. In combination with that feature, the link is also restrained by means of the pitch control thread 43 with the housing to control the incremental advance of the link per unit rotation. The slide itself advantageously translates with the link to guide the mechanism linearly within the body. Thus, a drive arrangement including drive gear 72 cooperates with the drive gear on the link to rotate the link, and a comparatively fine pitch control thread 43 cooperates with the housing to control the advance of the link, with a slide arrangement associated with the link to allow both rotation under the control of the drive gear and advance under the control of the pitch control thread.

Figure 2:
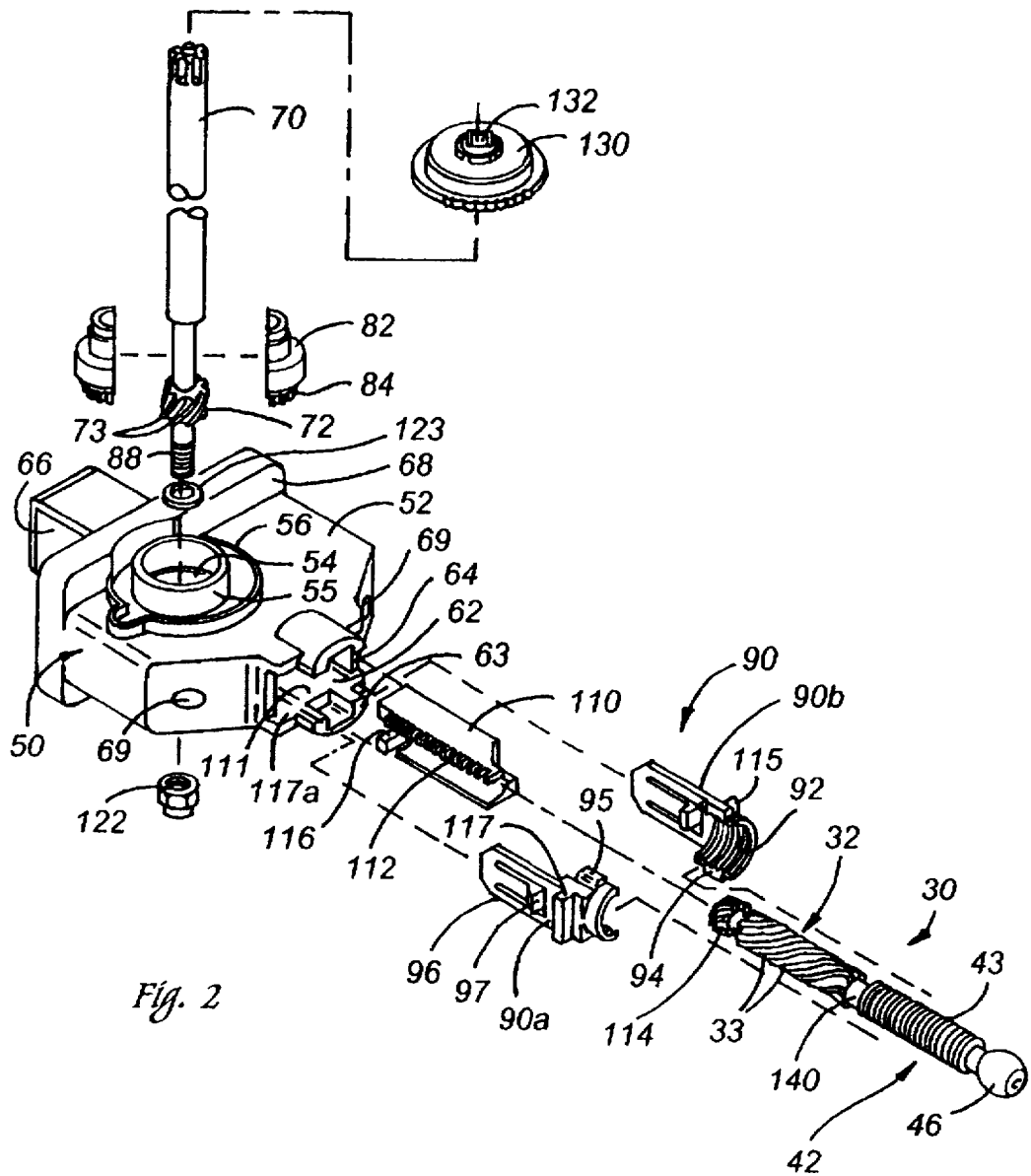
FIG. 2 is an exploded perspective view of the headlight adjuster, exposing the component parts thereof.
Figure 3:
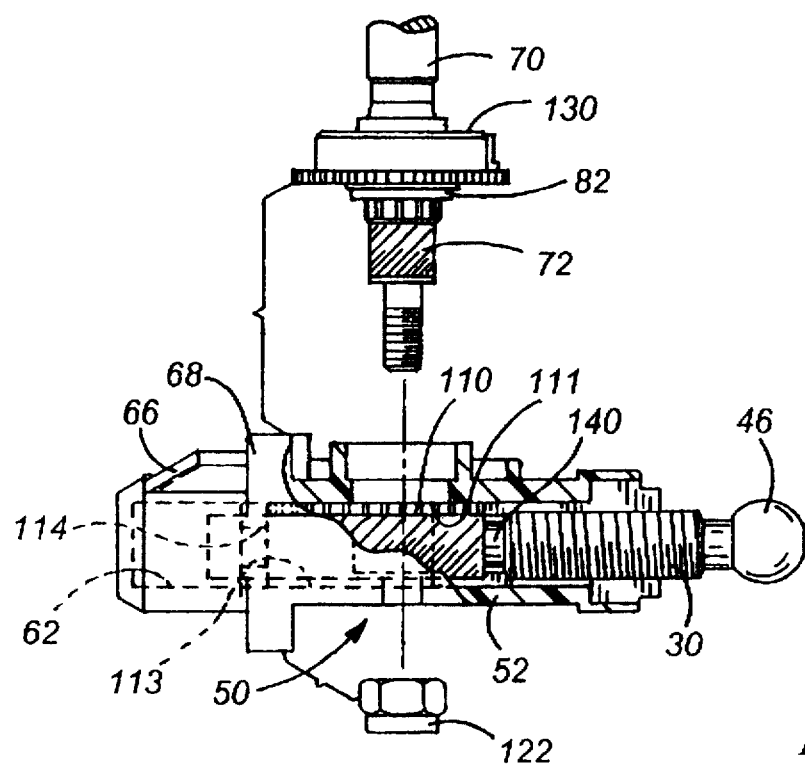
FIG. 3 is an enlarged cross sectional side view of the headlight adjuster and showing the link in a substantially withdrawn position.
Figure 4:
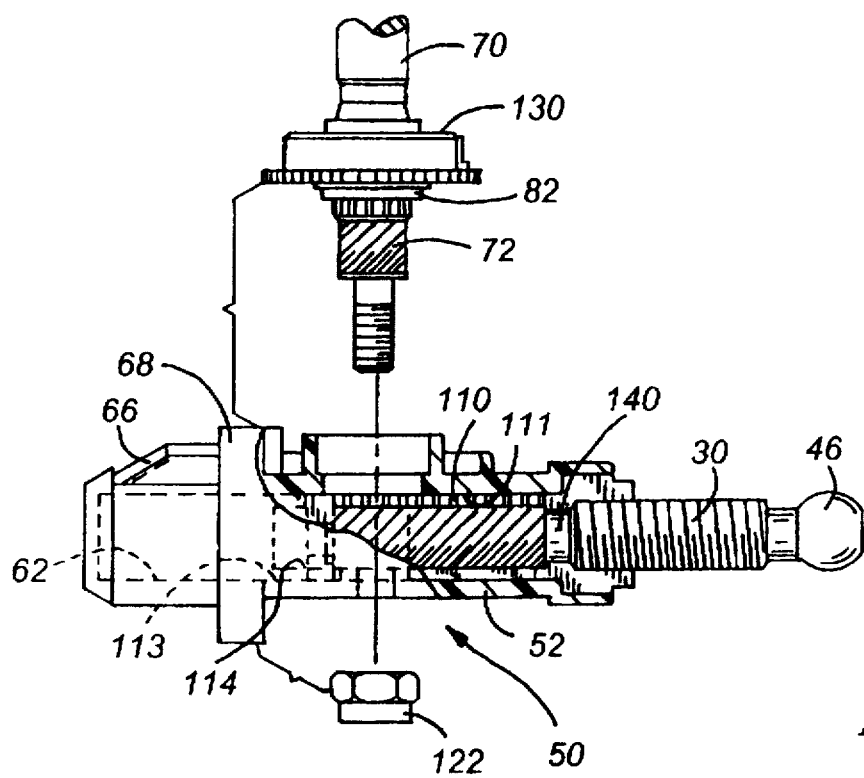
FIG. 4 is an enlarged cross-sectional side view of the headlight adjuster and showing the link in the fully extended position.

Referring in greater to FIGS. 2, 3 and 4, it will be seen that the link 30 is constrained for rotation within a traveling bearing 110 which itself is constrained for translation within a shaped passage 111 of the housing which matches the outer peripheral shape of the bearing 110. Thus, the rear section 32 of the link 30 fits within the traveling bearing 110. A cylindrical bearing slot 114 on link 30 mates with the yoked bearing surface 116 so that the bearing 110 will travel with link 30 as it translates under engagement of the pitch control thread 43. The bearing surface 116, in the traveling bearing 110 is an open ended circular bottomed channel to allow the link 30 to be assembled to the bearing 110 simply by snap fitting the bearing slot 114 within the corresponding bearing surface 116 of the bearing 110. Thus the link 30 translates the bearing 110, in which the link is journaled as it rotates under the drive-control of the drive gear 72.

It will be seen that the bearing 110 has a generally rectangularly outer surface which is slideable within similar rectangularly channel 112 within the body 52. Thus, the traveling bearing 110 is adapted to control translation within the housing 52 along the axis of the link 30. The cooperative engagement between the mounting of the link 30 within the bearing 110 and the mounting of the bearing 110 within the recessed channel 112, and the relative positioning of that arrangement with respect to the drive gear 72 allows the gear teeth 73 to rotate the link 30 within the bearing 110, and the bearing 110 to translate along the axis of the link 30.

In accordance with the invention, and in cooperation with the aforementioned elements, the pitch control thread 43 engages a nut 90 which is fixed within the housing 52. Since the nut 90 is fixed in the housing 52 against both translation and rotation, and since the nut 90 has threads which engage the threads 43 of the link 30, rotation of the link serves to advance or retract the link 30 along its axis at a rate controlled by the rotation of the link and the pitch of the thread 43.

Thus, pursuant to the invention, the interaction between the pitch-control thread 43 of the link 30 and the internal thread 92 of the nut 90 causes the link 30 to advance or retract at the rate of one thread 43 per revolution of the link. If the link did not journal or rotate in bearing 110, and if the nut 90 were not present the rate of linear advance would be determined by the pitch diameter of the input gear 72. Thus more precise adjustment is achieved.

As an example, if the drive shaft 70 were rotated a full turn, the drive gear 72, which is affixed to the shaft 70, would similarly be rotated a full turn. Due to the interengagement of the gear teeth 73 and 33, and assuming a one-to-one ratio between the gears 72 and 32, the link would similarly be rotated one full turn. The linear bearing 110 would allow that one full turn of rotation. However, the nut 90, being fixed within the housing 52, would allow the link to translate according to the pitch of the nut, by a linear distance corresponding to one rotation of the pitch control thread 43 within the nut, on the order one millimeter. The linear bearing 110 supports the link for rotation, and translates with the link by the translation increment allowed by the nut. The advantage resides in part in the fact that the shaft 70 can be rotated by a relatively significant increment in order to achieve a fairly fine degree of control of translation of the link 30. The ratio between the gears 72, 32 is selected to allow adequate torque to be transmitted through the driving connection. The pitch control thread 43 is configured to allow a reasonable degree of translation per unit rotation. The gear teeth 33, and threads 43 are independently selected, the gear teeth 33 for torque and size requirements, and the thread 43 for pitch control. The establishment of those two parameters can be made somewhat independently to allow for an adjustment mechanism which can be easily operated, which remains set in position once adjusted, and which provides a relatively fine degree of translation control.

The structure of the preferred embodiment will now be described in greater detail. Note will be taken of the relatively simple molded or cold headed elements which make up the majority of the components, and the relative ease with which they are assembled. The overall operation, having now been described in detail, will be understood to result from the interrelationship of these components now to be described. However, it will also be appreciated that other detailed forms of construction will now be apparent to one of ordinary skill in the art, which are capable of achieving the overall functional and structural interrelationship described in detail above.

As depicted in FIGS. 3, 4, and 6, the drive shaft 70 is rotatably mounted in (or journaled by) the housing 50 in a way that permits the longitudinal axis the drive shaft 70 to be orientated generally perpendicular to, but slightly offset from, the longitudinal axis of the link 30. Preferably, the drive shaft 70 is made of steel. Furthermore, like the first section 32 of the link 30, the drive gear 72 of the drive shaft 70 is preferably defined by multiple helixes (gear teeth) 73, rather than by a single helix. For instance, (as shown in FIG. 8) in the illustrated embodiment, the drive gear 72 is defined by seven helixes or starts. The gears 72 and 32 must have equal circular pitch, must have whole tooth increments, have like tooth profiles, preferably engage on the pitch circles, must have complementary angles, and must have helixes that are handed for the correct direction of input to output.

In the illustrated embodiment, the link 30 is made of steel, and the two distinct helix sections are both formed by rolling, in order to provide a part which can be manufactured at a cost commensurate with the needs of the application. The two distinct helixes 32, 42 are independently formed by cold rolling operations performed in sequence, but the need to have the fine threads 42 is avoided. If desired, a small gap can separate the helixed sections 32, 42.

Preferably, the first threaded section 32 of the link 30 is defined by multiple helixes 33, rather than by a single thread.

For instance, in the illustrated embodiment, the first threaded section 32 has seven individual helixes each of which has a lead of 20.8 millimeters.

The second threaded section 42, on the other hand, is preferably defined by a single thread 43 which has a lead of 1.0 millimeter.

The rotation of the link 30 by the input shaft 70 is accomplished by conventional right angle helical gearing with both members separated at 90° by the sum of pitch radii of both gears.

The drive shaft 70 is supported for rotation within the housing 50 by a ring member 82 disposed immediately above the drive gear 72. In the illustrated embodiment, the ring member 82 comprises two identical halves and is coupled to the drive shaft 70 by a small disk 130 having a hole 132 therethrough. As shown in FIGS. 2–4, the hole 132 of the disk 130 fits over the drive shaft 70 and engages the upper portion of the ring member 82. A tight slip fit between the hole 132 of the disk 130 and the upper portion of the ring member 82 retains the two halves of the ring member 82 together, but permits the ring member 82 to rotate with respect to the drive shaft 70, and allows the disk 130 to rotate relative to the ring member 82.

As best shown in FIG. 2, the ring member 82 of the drive shaft 70 is received by a hole 54 formed in the body portion 52 of the housing 50. The housing 30 includes a boss 55 formed around the hole 54 and projecting upwardly from the body portion 52 of the housing 50 for providing bearing support for the ring member 82. A small circular ridge 56, formed concentric to and around the hole 54, surrounds and protects the outer periphery of the disk 130.

The drive shaft 70 is coupled to the housing 50 by a small nut 122 which threadably engages the lower end 88 of the drive shaft 70 and seats against the body portion 52 of the housing 50 (see FIG. 4). In order to control how easy (or difficult) is to manually rotate the drive shaft 70, the nut 122 may be turned to varying degrees tightness. As such, the nut 122 provides a means for readily adjusting the torque required to rotate the drive shaft 70. A washer 123, arranged on the lower end 88 of the drive shaft 70 and disposed between the drive gear 72 and the housing 50, may be used to prevent wear of the plastic housing 50 caused by rotation of the metal drive gear 72.

The housing 50 also includes a passage 62 for fixedly receiving the nut 90 and for slidably receiving the traveling bearing 110. As shown in FIGS. 2–4, the passage 62 has a generally rectangular cross-section which starts at the triangular tip of the body portion 52 of the housing 50 and extends substantially through the housing 50. Although the passage 62 of the illustrated embodiment has a rectangular cross-section, it will be appreciated by those skilled in the art that the passage 62 may have other cross-sectional shapes as long as it prevents the traveling bearing 110 from rotating as the link 30 is advanced or retracted. A generally rectangular tubular extension 66, formed integrally with and projecting rearwardly from the mounting flange 68, provides a continuation for the passage 62 and enables the housing 50 to accommodate the link 30 when it is in the fully withdrawn position (FIG. 3). In the diagrammatic illustration of FIG. 1, the extension 66 projects rearwardly through an opening in the vertical frame 16.

The nut 90 of the illustrated embodiment, as best shown in FIG. 2, is comprised of two identical plastic halves 90a, 90b which are received by the passage 62 of the housing 50. More specifically, the nut 90 comprises a pair of flanges 94, 95 which engage similarly shaped slots 63, 64 in the body portion 52 of the housing 50 and prevent the nut 90 halves from separating with respect to each other under axial loading of link 30. Anti-rotation of the nut takes place between surfaces 117 of the nut 90, and 117a of the housing in four places. The nut 90 further comprises a finger portion 96 which is received by the passage 62 of the housing 50 and the internal thread portion 92 which mates with the second threaded section 42 of the link 30. Although the nut 90 described herein is formed of two separate pieces, it will be understood, of coarse, that the nut 90 could alternatively be formed of unitary construction provided that the ball end 46 or the gear end 32 of the link 30 were smaller than the inside diameter of the nut 90.

Each half 90a, 90b of the nut 90 also includes a flexible prong 97 which prevents the nut 90 from being removed once it has been assembled to the housing 50. In particular, as the nut 90 is inserted into the passage 62 of the housing 50 during assembly, the prongs 97 initially flex away from the passage 62 (as shown by the dashed lines in FIG. 5). Once nut 90 is fully inserted, however, the prongs 97 return to their original form and engage a pair of internal slots 65 formed within the passage 62 of the housing 50 (as shown by the solid lines in FIG. 5). A pair of projections 115 on the nut halves act to oppose the prongs 97 with a precise gap to fully constrain the nut in the axial direction of the link 30.

In accordance with the present invention, the traveling bearing 110 is carried by the link 30 and is slidably received by the passage 62 of the housing 50. As shown in FIG. 2, the traveling bearing 110 has a cross-sectional shape similar to the cross-sectional shape of the passage 62 which enables the bearing 110 to move linearly back-and-forth in conjunction with the link 30, but prevents it from rotating relative to the housing 50. Thus, in application, the passage 62 forms a linear bearing surface 113 (i.e. a surface substantially parallel to the longitudinal axis of the link 30) which interfits with the traveling bearing 110 and which guides the link 30 as it advances or retracts in response to rotation of the drive shaft 70. In the illustrated embodiment, the traveling bearing 110 snap fits over the first section 32 of the link 30 in a way that permits the link 30 to rotate with respect to the bearing 110. Moreover, the traveling bearing 110 is arranged substantially around the perimeter of the first threaded section 32 of the link 30 such that only the side of the link 30 which engages the drive shaft 70 is exposed.

In operation, when the drive shaft 70 is rotated with respect to the housing 50, the drive gear 72 coacts with the first gear section 32 of the link 30 to rotate the link 30 within the sliding bearing 110. Rotation of the link causes cooperation between the pitch control thread 43 of the link 30 and the nut 90 to cause the link to advance or retract in a linear direction at a rate controlled by the pitch of the pitch control thread 43. Advancement or retraction of the link carries the linear bearing 110 along with it, and serves to adjust the headlight under the control of rotation of the shaft 70.

Comparing FIGS. 3 and 4 of the drawings, the degree of linear travel of the link 30 will be apparent. FIG. 3 shows the link in relatively retracted position, whereas FIG. 4 shows the link fully extended. In the practice of the prior art, travel between the FIGS. 3 and 4 position would be achieved with only one rotation of the shaft 70.

However, in accordance with the invention, a fine degree of control is provided with linear motion of the link being related to rotation of the input shaft 70 by a ratio, in the preferred embodiment of about one millimeter per revolution. Thus, in order to move from the FIG. 3 to the FIG. 4 position (a very unusual adjustment) would require on the order of 20.8 rotations of the input shaft 70. However, since adjustments are normally relatively fine, the degree of control about an adjusted position will be very compatible with relatively precise aiming of the headlight.

Figure 5:
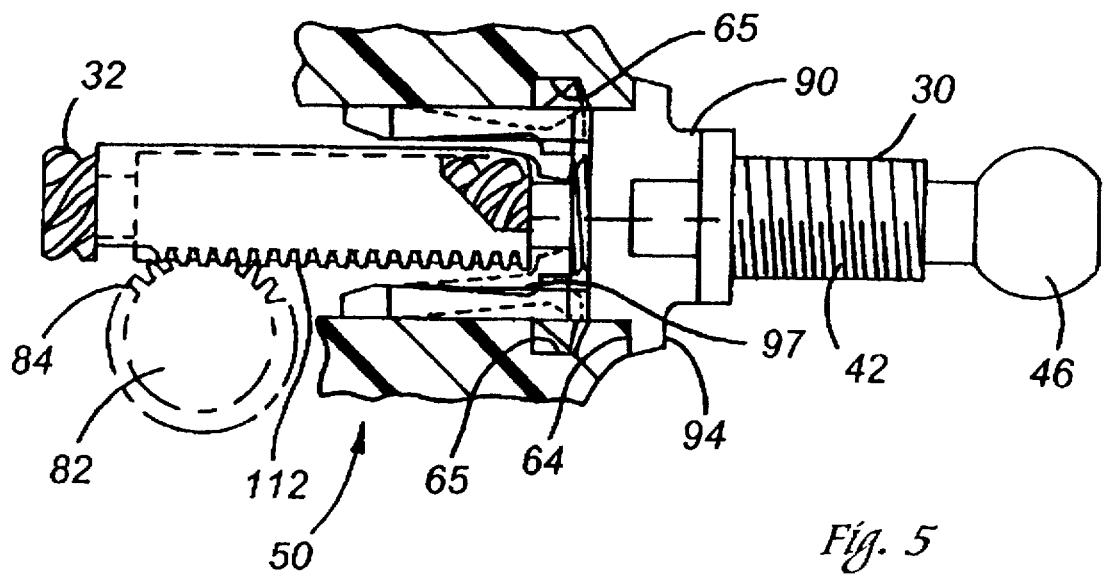
FIG. 5 is an enlarged, fragmentary cross-sectional view of the headlight adjuster taken substantially along line 5—5 in FIG. 1.

In keeping with a further feature of the invention, the traveling bearing 110 also includes a notch interface 112 which cooperates with spur gear teeth 84 formed on the lower portion of ring member 82, as shown in FIG. 5. In use, as the link 30 is linearly advanced or retracted by the drive shaft 70, the notch interface 112 of the traveling bearing 110 engages the teeth 84 of the ring member 82 and rotates the ring member 82 and the disk 130 with respect to drive shaft 70.

Because the link 30 moves at a slower rate than is indicated by the rate of rotation of the drive shaft 70, the amount of drive shaft 70 rotation does not provide a true indication of linear link 30 movement. An accurate indication of link 30 movement is, however, provided by the traveling bearing 110 since it moves in conjunction with the link 30. Because the notched interface 112 of the traveling bearing 110 causes the ring member 82 to rotate with respect to drive shaft 70, a reliable indication of total link 30 movement is provided by how much the ring member 82 rotates with respect to the drive shaft 70. In operation, as the drive shaft 70 is manually rotated, a turn indicator gauge 134 formed on the top surface of the disk 130 provides a means for exhibiting how much the ring member 82 rotates with respect to the drive shaft 70. Accordingly, the gauge 134 also provides an accurate indication of linear link 30 movement. The scale units represent angular shift of the head lamp. Since the ring member 82 is engaged fractionally on the shaft 70, and since the disk 130 is engaged fractionally on the ring member 82, the scale can be mechanically zeroed at the factory after the headlights are adjusted. When the headlights are finally adjusted, a special tool can be used to turn the disk member 130 until the scale (see FIG. 2) shows a zero position for the factory preset adjustment of the headlights. Thereafter, if the headlights require adjustment, the scale serves as a measure of the amount of adjustment from the factory preset position.

While a particular embodiment of the present invention have been described herein, it will be understood, of coarse, that the invention is not strictly limited thereto. Since modifications may be made to the disclosed structures by those skilled in the art without departing from the essence of the invention, the appended claims are intended to cover all structures, regardless of modifications, that fall within the scope and spirit of the present invention, whether or not such structures are specifically described herein.

I claim as my invention:

1. A headlight adjuster for adjusting the aim of a headlight, the headlight adjuster comprising, in combination:

a housing;

a link mounted in the housing traveling along a link axis in an advance-and-retract direction, the link having two rolled helical threaded sections, a first helical threaded section having a relatively coarse drive helix and a second helical threaded section having a relatively fine pitch-control thread;

a drive shaft rotatably mounted in the housing and having a drive gear which mates with the coarse drive helix of the link for rotating the link;

a nut in the housing, the nut having an internal thread which mates with the pitch-control thread of the link, the nut being restrained from rotation in the housing so that rotation of the link moves the link along the link axis at a rate controlled by the pitch-control thread;

the housing having a linear bearing surface parallel to the link axis; and the link carrying a traveling bearing, the traveling bearing interfit with the linear bearing surface of the housing for guiding the link along the link axis.

2. The headlight adjuster as defined in claim 1 wherein the link is adapted to be connected to a vehicle headlight assembly.

3. The headlight adjuster as defined in claim 1 wherein the first helical threaded section of the link is defined by multiple helical threads, and the drive gear has multiple helical threads which engage the multiple helical threads of the link.

4. The headlight adjuster as defined in claim 3 wherein the drive shaft is oriented generally perpendicular to and offset from the link.

5. The headlight adjuster as defined in claim 1 wherein the pitch-control thread of the link is defined by a thread having a pitch of about one millimeter.

6. The headlight adjuster as defined in claim 1 wherein the linear bearing surface comprises a passage formed within the housing.

7. The headlight adjuster as defined in claim 6 wherein the traveling bearing is slidably mounted in the passage.

8. The headlight adjuster as defined in claim 7 wherein the passage and the traveling bearing have generally rectangular cross-sections and the traveling bearing fits within the passage so as to prevent the traveling bearing from rotating with respect to the housing.

9. The headlight adjuster of claim 8 wherein the link has at least one bearing surface which engages the traveling bearing to allow rotation of the link and to carry the traveling bearing with the link along the passage.

10. The headlight adjuster as defined in claim 1 wherein the drive shaft is supported for rotation within the housing by a ring member.

11. The headlight adjuster as defined in claim 10 wherein the ring member is coupled to the drive shaft by a disk having a hole therethrough, the disk being slip fit over the drive shaft.

12. The headlight adjuster as defined in claim 11 wherein the ring member is comprised of two halve members.

13. The headlight adjuster as defined in claim 11 wherein the ring member includes teeth which cooperate with a notched interface formed on the traveling bearing, the interaction of the teeth and the notched interface causing the ring member to rotate with respect to the drive shaft when the link is translated.

14. The headlight adjuster as defined in claim 13 wherein an indicator gauge formed on the disk indicates an amount of link translation.

15. The headlight adjuster as defined in claim 1 wherein the nut comprises two halves fixed within the housing.

16. The headlight adjuster as defined in claim 15 wherein the nut includes a pair of flanges which engage similarly shaped slots in the housing.

17. The headlight adjuster as defined in claim 16 wherein the nut includes flexible prongs which engage internal slots formed within the housing so as to prevent the nut from being removed from the housing.

18. The headlight adjuster as defined in claim 1 further comprising a torque adjuster connected to the drive shaft.

19. The headlight adjuster as defined in claim 18 wherein the torque adjuster comprises a nut threadedly attached to the drive shaft and engaging the housing serving to adjust the torque required to rotate the drive shaft.

20. The headlight adjuster as defined in claim 1 wherein the link has a ball at an operating end thereof for rotatably engaging a socket attached to the headlight, when adjusting the headlight.

* * * * *